United States Patent
Burkhardt et al.

(10) Patent No.: US 12,181,019 B2
(45) Date of Patent: Dec. 31, 2024

(54) SYSTEMS AND METHODS FOR ASSEMBLING AND REPAIRING CHAINS

(71) Applicant: Rexnord Industries, LLC, Milwaukee, WI (US)

(72) Inventors: David Keith Burkhardt, Milwaukee, WI (US); David Richard Woods, Menomonee Falls, WI (US); Joseph L Vento, Franklin, WI (US); Kyle Steven Jansson, Brookfield, WI (US)

(73) Assignee: REXNORD INDUSTRIES, LLC, Milwaukee, WI (US)

( * ) Notice: Subject to any disclaimer, the term of this patent is extended or adjusted under 35 U.S.C. 154(b) by 0 days.

(21) Appl. No.: 18/737,337

(22) Filed: Jun. 7, 2024

(65) Prior Publication Data
US 2024/0328480 A1 Oct. 3, 2024

Related U.S. Application Data

(63) Continuation of application No. PCT/US2022/051901, filed on Dec. 6, 2022.

(60) Provisional application No. 63/287,747, filed on Dec. 9, 2021.

(51) Int. Cl.
*F16G 13/06* (2006.01)

(52) U.S. Cl.
CPC ................... *F16G 13/06* (2013.01)

(58) Field of Classification Search
CPC .......... F16G 13/06; F16G 15/12; F16G 13/08; B21L 9/065
USPC ............................................................ 59/4
See application file for complete search history.

(56) References Cited

U.S. PATENT DOCUMENTS

| | | | | |
|---|---|---|---|---|
| 1,235,321 A | * | 7/1917 | James | F16G 13/02 474/222 |
| 2,204,245 A | * | 6/1940 | Bower | A01C 7/02 111/82 |
| 2,553,646 A | * | 5/1951 | Field | B62D 55/0887 305/47 |

(Continued)

FOREIGN PATENT DOCUMENTS

| | | |
|---|---|---|
| CN | 105736636 A | 7/2016 |
| CN | 209354593 U | 9/2019 |

(Continued)

OTHER PUBLICATIONS

Nord-Lock, Inc. / Superbolt, Inc., Mechanical Expansion Bolts Overview, http://web.archive.org/web/20210418232015/https://www.nord-lock.com/superbolt/products/ezfit/, Accessed on Apr. 18, 2021, 6 pages.

(Continued)

*Primary Examiner* — Henry Y Liu
(74) *Attorney, Agent, or Firm* — Quarles & Brady LLP

(57) ABSTRACT

A chain assembly system can include an inner chain link and an outer chain link. The inner chain link and the outer chain link can define a pair of bores. The chain assembly system can include a pin including a head end that defines a head, and a thread end opposite the head end having threads. The chain assembly system can include a nut configured to threadingly engage the threads of the thread end of the pin and an axial stop that is configured to block further advancement of the nut along the thread end of the pin towards the head end of the pin when the pin contacts the axial stop.

10 Claims, 9 Drawing Sheets

(56) References Cited

U.S. PATENT DOCUMENTS

| | | | | |
|---|---|---|---|---|
| 2,647,023 | A * | 7/1953 | Kubaugh | B62D 55/0887 305/59 |
| 2,893,788 | A * | 7/1959 | Yerian | B62D 55/213 29/256 |
| 3,379,072 | A * | 4/1968 | Kuntzmann | F16G 13/06 474/218 |
| 3,711,928 | A * | 1/1973 | Boggs | B62D 55/32 29/402.02 |
| 3,811,334 | A * | 5/1974 | Kuenzig | F16G 13/06 474/231 |
| 4,263,779 | A * | 4/1981 | Petershack | F16G 13/06 474/227 |
| 4,494,945 | A * | 1/1985 | Ogino | F16G 13/06 474/202 |
| 4,506,501 | A * | 3/1985 | DeVall | B21L 9/065 29/402.09 |
| 4,833,875 | A * | 5/1989 | Buermann, Jr. | B21L 9/065 29/525 |
| 4,998,907 | A * | 3/1991 | Sawada | B21L 9/065 474/206 |
| 5,203,158 | A * | 4/1993 | Bowers | B21L 21/00 59/7 |
| 5,305,872 | A * | 4/1994 | Hutton | B65G 19/24 198/853 |
| 5,431,518 | A * | 7/1995 | Young | F16B 33/004 411/908 |
| 5,682,646 | A * | 11/1997 | Tyler, IV | E05D 5/062 16/386 |
| 6,263,764 | B1 * | 7/2001 | Steinbock | F16B 31/04 81/57.38 |
| 6,453,657 | B1 * | 9/2002 | Teravainen | B25B 27/026 59/11 |
| 6,951,096 | B2 * | 10/2005 | Maguire | B62D 55/32 269/95 |
| 6,991,094 | B2 * | 1/2006 | Frost | F16G 13/10 198/853 |
| 7,007,360 | B2 * | 3/2006 | Huenefeld | B21L 21/00 29/252 |
| 7,100,353 | B1 * | 9/2006 | Maguire | B21L 21/00 269/95 |
| 7,246,699 | B2 * | 7/2007 | Frost | F16G 13/10 198/852 |
| 7,281,627 | B1 * | 10/2007 | Gunston | B65G 19/24 198/852 |
| 7,726,469 | B2 * | 6/2010 | Frost | B65G 17/38 198/850 |
| 8,499,927 | B2 * | 8/2013 | Farley | F16G 13/06 474/228 |
| 8,905,880 | B2 * | 12/2014 | Inoue | B21L 9/065 474/234 |
| 9,415,939 | B2 * | 8/2016 | Arnold | B65G 19/20 |
| 10,865,046 | B2 * | 12/2020 | Frost | F16G 13/08 |
| 10,982,540 | B2 * | 4/2021 | Crystal | F16B 37/14 |
| 11,958,102 | B2 * | 4/2024 | Vento | F16G 13/06 |
| 2015/0292180 | A1 * | 10/2015 | Sester | E02F 3/58 37/399 |
| 2020/0023914 | A1 * | 1/2020 | Galat | B62D 55/213 |

FOREIGN PATENT DOCUMENTS

| | | |
|---|---|---|
| DE | 3200049 C1 | 8/1983 |
| DE | 202006014357 U1 | 12/2006 |
| DE | 102016014282 A1 | 5/2018 |
| EP | 2143521 A1 | 1/2010 |
| FR | 2551821 A1 | 3/1985 |
| GB | 534277 A | 3/1941 |
| WO | 2006039412 A2 | 4/2006 |

OTHER PUBLICATIONS

PCT International Search Report and Written Opinion, PCT/US2022/051901, Mar. 8, 2023, 11 pages.

PCT Third Party Observation, PCT/US2022/051901, Apr. 8, 2024, 6 pages.

Kettenwulf, Chains and Sprockets for the Bulk Material Handling Industry, Product Catalogue, 2016, 92 pages [Cited Reference to Third Party Observation, PCT/US2022/051901, dated Apr. 8, 2024].

Kettenwulf, Roller Chains for Drive and Conveyor Applications, Product Portfolio, 2020, 146 pages [Cited Reference of Third Party Observation, PCT/US2022/051901, dated Apr. 8, 2024].

Linn, R., Förderketten und Kettenräder: Grundlagen, Weiterentwicklung und Anwendungsbeispiele. Springer Vieweg, 2017, 183 pages [Cited Reference of Third Party Observation, PCT/US2022/051901, dated Apr. 8, 2024].

Kettenwulf, Chains and Sprockets for the Amusement Park Industry, 2016, 8 pages [Cited Reference of Third Party Observation, PCT/US2022/051901, dated Apr. 8, 2024].

Moroccan Office of Industrial and Commercial Property (OMPIC), Research Report with Opinion on Patentability, Application No. 65760, Nov. 11, 2024, 6 pages [English Language Translation Unavailable].

* cited by examiner

SYSTEMS AND METHODS FOR ASSEMBLING AND REPAIRING CHAINS

CROSS-REFERENCE TO RELATED APPLICATIONS

This application is a continuation application of International Application No. PCT/US2022/051901 filed on Dec. 6, 2022 which claims priority to U.S. Provisional Patent Application No. 63/287,747 filed on Dec. 9, 2021, the entire contents of which are incorporated herein by reference.

BACKGROUND

Industrial chains are used in a variety of industries including conveyor (or elevator) systems for mines, processing plants, agricultural plants, recycling plants, refineries, foundries, and so forth. While certain chains may last longer than others, all chains in continual use eventually require repair (for example, by failing) as components wear on one another during operation. Rather than replacing the entire chain, which would be quite costly, chain links are frequently repaired in the field to bring the conveyor system back into operation.

However, repairing chains in the field still can be laborious, difficult, cumbersome, and slow. In many instances, the site of repair may be cramped or difficult for the repairperson to access. Still further, tools are often required as part of the repair process and, either based on the size of the tools (given the space and conditions of the working space for repair) or the availability of the power systems to run the tools, it can be physically and logistically difficult to execute a repair. Downtime can be very costly if a repair cannot be quickly implemented and so there remains a high demand for a robust and efficient system for repairing chains.

SUMMARY

According to one aspect, this disclosure provides a chain assembly system. The chain assembly system includes an inner chain link and an outer chain link. The inner chain link and the outer chain link defines a pair of bores. The chain assembly system includes a pin including a head end that defines a head, and a thread end opposite the head end having threads. The chain assembly system includes a nut configured to threadingly engage the threads of the thread end of the pin and an axial stop that is configured to block further advancement of the nut along the thread end of the pin towards the head end of the pin when the pin contacts the axial stop. The thread end of the pin is configured to be inserted through the pair of bores that are aligned, and threadingly engaged with the nut that is configured to be externally positioned relative to the outer chain link. When the thread end of the pin is inserted and the nut is threadingly engaged with the thread end of the pin, the nut is configured to be tightened to create an interference fit between the pin and the outer chain link at a bore of the outer chain link, and further tightened until the pin contacts the axial stop to block translation of the pin thereby blocking translation of the nut.

In some forms, the pin may include a body that is coupled to the head end and the thread end. A first cross-section of the thread end may be smaller than a second cross-section of the body to define a shoulder that is a radial step. In some forms, the system may further include a washer that defines the axial stop. The washer has a hole that is larger than the thread end of the pin on which the washer is receivable and the hole is small enough that the washer does not extend beyond the shoulder on the pin. With such a washer, as the nut is advanced along the thread end and towards the head end to push the washer into the outer link and toward the shoulder of the pin, the washer may contact the shoulder of the pin to block further axial advancement of the nut, thereby serving as the axial stop.

In some forms, the nut may include a bore defining an open end and an enclosed end. The enclosed end may include a wall that is the axial stop and the pin may contact the wall to block further advancement of the nut along the pin. The bore may partially extend through the nut so that the wall fully encloses the nut. The nut may include a recess. The nut may have the bore directed into one side of the nut and further may have the recess directed into an opposing side of the nut. The recess may be configured to receive a tool adapter to drive rotation of the nut.

In some forms, the nut may include a first bore having a first cross-section and a second bore coaxial to the first bore and adjacent to the first bore. The second bore may have a second cross-section smaller than the first cross-section of the first bore. The second bore may have threads. An end surface of the nut proximal to the bore may be the axial stop. The thread end of the pin may be configured to be inserted through the first bore, into the second bore, and may be threadingly engaged with the second bore. The surface of the nut at the second bore may contact the body of the pin to block further advancement of the pin, thereby blocking further advancement of the nut along the pin.

In some forms, the nut may be a single nut that is configured to be advanced along the thread end of the pin to create an interference fit between the pin and the outer chain link.

In some forms, an exterior surface of the nut may be configured to be engaged by a power tool to advance the nut to create the interference fit.

In some forms, a portion of the pin is not configured to be broken off from the pin after the interference fit is created.

The foregoing and other aspects and advantages of the present disclosure will appear from the following description. In the description, reference is made to the accompanying drawings that form a part hereof, and in which there is shown by way of illustration one or more exemplary versions. These versions do not necessarily represent the full scope of the disclosure.

BRIEF DESCRIPTION OF THE DRAWINGS

The following drawings are provided to help illustrate various features of non-limiting examples of the disclosure and are not intended to limit the scope of the disclosure or exclude alternative implementations.

DETAILED DESCRIPTION

Figure 1:
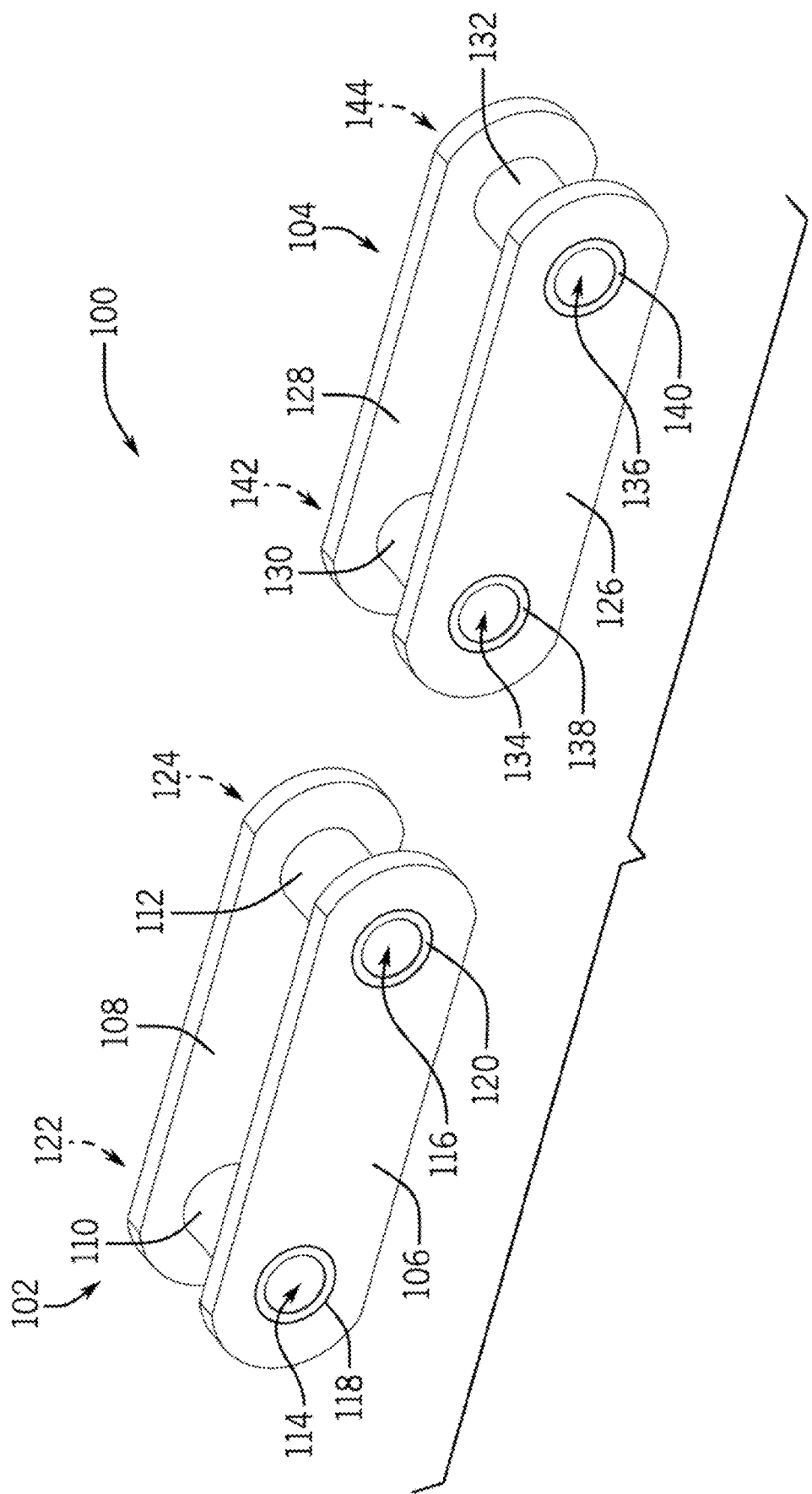
FIG. 1 shows a front perspective view of a chain that has chain links, which are disconnected and are to be assembled, for example repaired, by coupling the chain links together.

As described above, repairing chains can be a difficult and time-consuming process. Typically, repairing chains, regardless of how the failure occurs, requires replacing one or more pins to rejoin the disconnected ends of the chain. For example, a replacement pin is inserted through a pair of bores, each through opposing ends of the chain to couple the chain links together. However, conventional repair methods have significant downsides.

For example, in one conventional approach, a welding torch can be used to physically join the end of the replacement pin to one of the chain links. However, welding often requires a combustible fluid to drive melting of the welding rod that deposits material to join the two components together. And because industrial chains often operate in enclosed spaces without ventilation, the welding approach cannot be used in this scenario (for example, due to fear of leaking of the combustible fluid into the enclosed space). So, in many instances, if welding is to be used, the chain must be taken offsite for repairs. Additionally, the welding approach-assuming it is possible in a given situation-requires extensive operator skill. Not every operator, and certainly not many, if at all present at the location the chain is being used at, are even capable (or available) to repair the chain. Still further, because the replacement pin has to be entirely inserted through both ends of each bore before welding, an interference fit is not formed at the coupling location between the chain link and the pin. This can be undesirable at least because each chain link is joined to its adjacent chain link with an interference fit, which is typically a stronger interface than the welded joint. And, because the welded joint is weaker, this is more likely to cause a subsequent failure at this weaker location rather than at different locations, which can be a hindrance for the site location that is using the chain (for example, because this repaired chain is weaker than a new chain).

As another example, in a second conventional approach, a grinder can be used to physically join the end of the replacement pin to one of the chain links. However, a grinded joint has similar issues as the welded joint. For example, grinding the joint also requires the replacement pin to be entirely inserted through both ends of each bore before welding, and so an interference fit is also not formed at the coupling location between the chain link and the pin. While the grinder does not usually use combustible fluid and thus it can be used in enclosed spaces, it does require a battery that must be charged to power the grinder. And so, the operator must remember to charge the battery prior to repair, and to remember to bring the charged battery to the repair location (along with the grinder). As with the welding approach, the grinding approach also requires a skilled operator to join the components together, which may be difficult to locate someone with this skill set at the repair site. Thus, the chain may need to be brought to an offsite location for repairs, which increases downtime for the conveyor system (for example, the time that the conveyor system cannot be used while the chain is being repaired).

As yet another example, in a third conventional approach, a hand powered pneumatic actuator, such as the Rexnord® Linkmaster and Rexnord® Drivemaster, can be used to create an interference fit between one end of the replacement pin and one of the chain links to physically join these components together. In this approach, the replacement pin is inserted through both bores as far as possible, and a drive assembly is placed around and in contact with both ends of the replacement pin. Then, an operator continuously drives the manual hand powered pump to force the replacement pin through the bore of the chain link thereby generating an interference fit between these components. While this approach does create an interference fit, multiple operators (for example, three) are required to steady (or align) opposing sides of drive assembly (for example, to ensure proper contact with the pin), and to operate the pneumatic pump to force to the drive assembly together to create the interference fit. Additionally, because this approach utilizes a hand-powered pneumatic actuator, it can take a significant amount of time and considerable manual effort to drive the pump and create the interference fit.

Some embodiments of this disclosure provide solutions to these issues (and others) by providing improved systems and methods for assembling and repairing chains. For example, some embodiments of the disclosure provide a chain assembly system that includes a pin (for example, a replacement pin), a nut, and an axial stop. The replacement pin can be inserted through two aligned bores of an outer chain link and an inner chain link, respectively. Then, the nut can threadingly engage an end of the replacement pin and, as the nut is advanced along the replacement pin, the replacement pin is pulled though an end of the outer chain link to create an interference fit between the replacement pin and the outer chain link. In some cases, as the nut is advanced, the pin can contact the axial stop, which can block further advancement of the nut along the pin, thereby preventing over-tightening of the nut that may undesirably lock the chain joint together. For example, without the axial stop, the nut can be continually advanced until the outer chain link contacts and abuts against the lower chain link, which can lock or bind the outer chain link and the lower chain link together, thereby preventing proper rotation of the outer chain link about the inner chain link (or vice versa). However, with the axial stop, the nut forces the outer chain link to be advanced a predetermined distance (on the replacement pin) until the nut contacts the axial stop, which can create the desired interference fit while avoiding the possibility of locking of the chain link joints. In addition, by using the axial stop, the required operator skill needed to repair the chain link can be decreased at least because the operator only needs to contact the axial stop with the pin to repair the chain (for example, which can be easily felt tactilely when the pin contacts the axial stop), rather than requiring that the operator to know the acceptable range of distances to advance the nut to create the interference fit without locking the chain joint.

FIG. 1 shows a front perspective view of a chain 100 that has chain links 102, 104, which are disconnected and are to be assembled or repaired by coupling the chain links 102, 104 together. As shown in FIG. 1, the chain link 102 includes plates 106, 108, bushings 110, 112, and bores 114, 116. The plates 106, 108 are separated from each other and are both coupled to the bushings 110, 112. Although the plates 106, 108 are illustrated as being planar and rectangular with rounded edges, the plates 106, 108 can be implemented to have different shapes or geometries. Each plate 106, 108 has holes that can at least partially define a respective bore. For example, the plate 106 has holes 118, 120 that are directed entirely through the plate 106, while the plate 108 has holes 122, 124 that are directed entirely through the plate 108. In some cases, the holes of the plates 106, 108 can provide a coupling location for the bushings 110, 112. For example, the bushing 110 can be inserted through the holes 118, 122 to couple the bushing 110 to the plates 106, 108 at these holes 118, 122 (such as by an interference fit, for example). Similarly, the bushing 112 can be inserted through the holes 120, 124 to couple the bushing 112 to the plates 106, 108.

As shown in FIG. 1, the bores 114, 116 can each provide an access channel through and between both plates 106, 108 at two locations. Thus, each bore 114, 116 is configured to receive a pin, such as from an adjacent chain link. In some cases, such as illustrated in FIG. 1, the bushings 110, 112 can each entirely define their respective bore 114, 116, with the bores 114, 116 being coaxially positioned relative to the holes of the plates 106, 108 (for example, with the bore 114 coaxially positioned relative to the holes 118, 122 and with the bore 116 coaxially positioned relative to the holes 120, 124). In other cases, such as described below, bores of other chain links can be defined by their holes of their plates. For example, the bore 114 can be defined by the holes 118, 122, while the bore 116 can be defined by the holes 120, 124.

In some embodiments, the bushings 110, 112 can include respective rollers coaxially received around the bushings 110, 112. In other cases, the bushings 110, 112 can be bushed rollers (such as steel bushed rollers). Regardless of the particular implementation, the interior surface of each bushing 110, 112 can provide a bearing surface that can allow a pin received through one of the bushings 110, 112 to easily roll over its interior surface. This bearing surface may be lubricated; however, in alternative configurations, the interior surface of the bushings 110, 112 may not be lubricated.

As shown in FIG. 1, the chain link 104 is structured in a similar manner as the chain link 102, and thus includes similar features as the chain link 102. For example, the chain link 104 also includes plates 126, 128, bushings 130, 132, and bores 134, 136. The bushings 130, 132 are each coupled to both plates 126, 128, and each plate 126, 128 also includes holes directed entirely therethrough. For example, the plate 126 includes holes 138, 140, while the plate 128 includes holes 142, 144. Similarly to the chain link 102, the bushing 130 is inserted through the holes 138, 142 to couple the bushing 130 to the plates 126, 128 at these holes 138, 142, while the bushing 132 is inserted through the holes 140, 144 to couple the bushing 132 to the plates 126, 128 at these holes 140, 144. As also similar to the chain link 102, each of the bushings 130, 132 can have an interior surface that can define a bearing surface that can allow a surface of a pin to roll along.

Although the chain 100 is illustrated in FIG. 1 as only having chain links 102, 104, it is to be appreciated that the chain 100 can have other chain links that are coupled to and extend from the chain links 102, 104. In other words, while the chain links 102, 104 each have only a single link as illustrated, the chain links 102, 104 can have other numbers of links such as, for example, a series of chain links.

Figure 2:
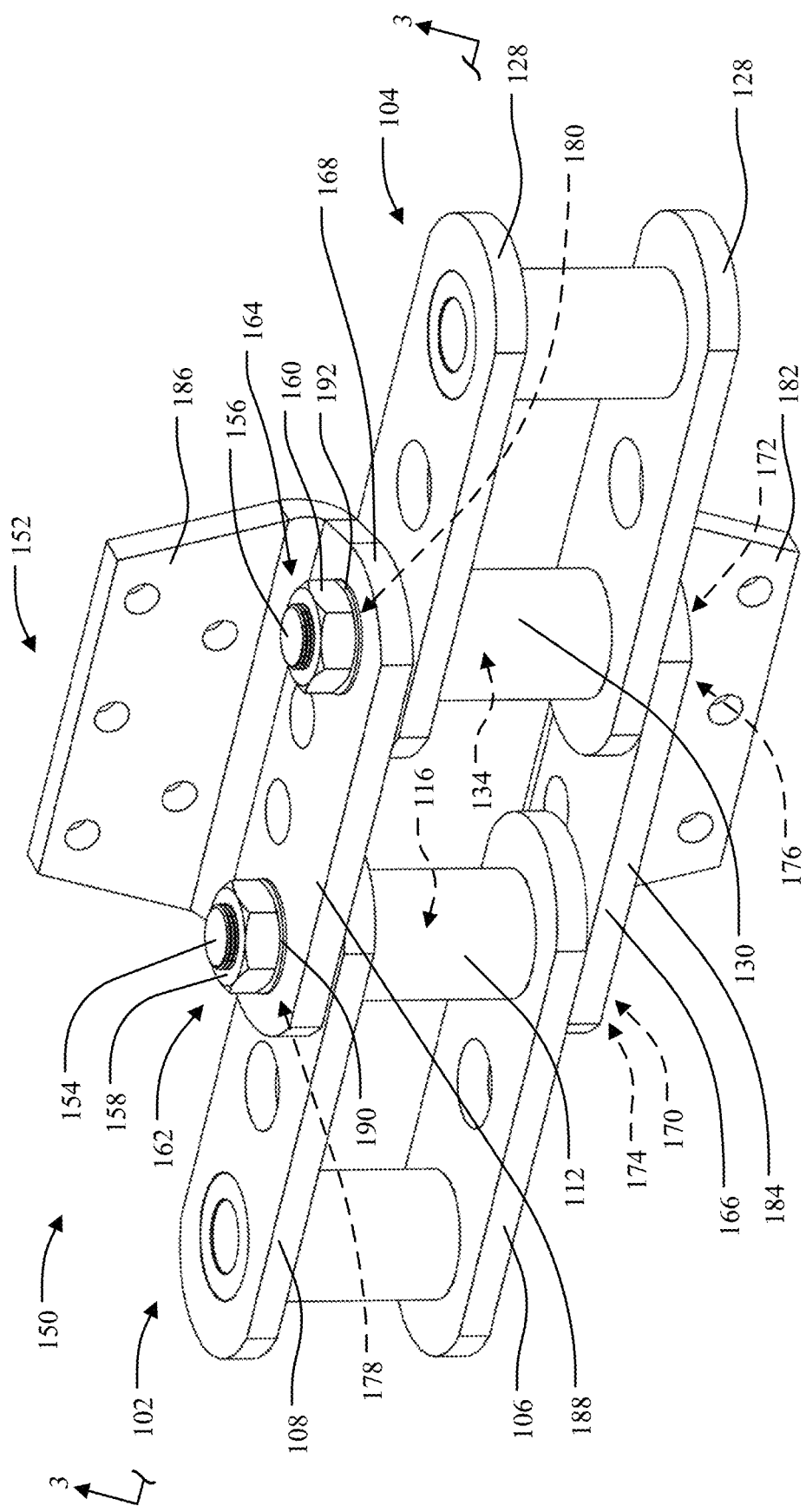
FIG. 2 shows a front perspective view of a chain assembly system.

FIG. 2 shows a front perspective view of a chain assembly system 150 (for example, for assembling a chain, for repairing a chain, and so forth), which can include the chain links 102, 104, and a chain link 152 to be coupled to the chain links 102, 104, for example, after a repair. The chain assembly system 150 can also include pins 154, 156, nuts 158, 160, and axial stops 162, 164. The chain link 152 can be implemented in a similar way as the chain links 102, 104, and can be defined as an outer chain link, while the chain links 102, 104 can each be defined as an inner chain link. For example and as illustrated, the chain link 152 includes plates 166, 168 that can collectively define bores 170, 172. In particular, the plate 166 has holes 174, 176 and the plate 168 also has holes 178, 180, where the holes 174, 178 can collectively define the bore 170 and where the holes 176, 180 can collectively define the bore 172. In some configurations, the plates 166, 168 can be structured similarly to each other (e.g., both having the same shape, such as being rectangular with rounded edges). In other configurations, the plates 166, 168 can be structured differently. In some embodiments, the plates 166, 168 can be structured similarly to the plates of the chain links 102, 104, while in other cases, each of the plates 166, 168 can be structured in a different manner as the plates of the chain links 102, 104. For example, as illustrated in FIG. 2, the plate 166 can have a flange 182 that extends away from a body 184 of the plate 166 that includes the holes 174, 176, while the plate 168 can have a flange 186 that extends away from a body 188 of the plate 168 that includes the holes 178, 180. In some cases, the flanges 182, 186 can extend away from each other in opposing directions, and each flange 182, 186 can include one or more holes directed therethrough for providing a coupling location (for example, a fastening location) for components to be coupled to the chain link 152. For example, each flange 182, 186 can include one or more holes that can facilitate the attachment of conveyor components (such as buckets, trays, and so forth) by inserting fasteners (such as, for example, bolts) of the conveyor component through the one or more respective holes to couple the conveyor component to the chain link 152. Although FIG. 2 illustrates that the flanges 182, 186 extend from the respective body 184, 188 at an angle that is substantially (that is, deviating by less than 10 percent from) 90 degrees, in other configurations the flanges 182, 186 can be angled relative to the respective body 184, 188 at a different angle.

In some embodiments, each of the bores 170, 172 are configured to receive a respective pin 154, 156. For example, the pin 154 can be inserted through the hole 174 until a head of the pin 154 that has a larger cross-section than the hole 174 contacts the plate 166. Similarly, the pin 156 can be inserted through the hole 176 until a head of the pin 156 that has a larger cross-section than the hole 176 contacts the plate 166. As described in more detail below, with the pins 154, 156 inserted through the plate 166, the pins 154, 156 can be inserted through the chain links 102, 104. For example, the pin 154 is configured to extend entirely through the bore 116 of the chain link 102 and is configured to partially extend through the hole 178 of the plate 168 (that is, a portion of a threaded end of the pin 154 being inserted through the hole 178). Similarly, the pin 156 is configured to extend entirely through the bore 134 of the chain link 104 and is configured to partially extend through the hole 180 of the plate 168 (that is, a portion of a threaded end of the pin 156 being inserted through the hole 180). With the pins 154, 156 extended through the plate 166, the chain links 102, 104, and the plate 168, each of the nuts 158, 160 can be engaged with one of the pins 154, 156. For example, the nut 158 is configured to threadingly engage the pin 154, while the nut 160 is configured to threadingly engage the pin 156.

As shown in FIG. 2, the chain assembly system 150 can include the axial stops 162, 164, each of which can be used with a respective pin 154, 156. Each axial stop 162, 164 can be configured to block relative movement between a nut and a respective pin, when the axial stop contacts the respective pin. For example, as the nut 158 is tightened and advanced along the thread end of the pin 154 towards the head end of the pin (opposite the thread end), the nut 158 forces the pin 154 through the hole 178 of the plate 168 to create an interference fit between the pin 154 and the plate 168 at the hole 178. As the nut 158 is further tightened, which can include after an interference fit has been created (which may be unbeknownst to the operator tightening the nut 158), the axial stop 162 contacts the pin 154, which blocks further relative movement between the nut 158 and the pin 154, thereby blocking further advancement of the nut 158 along the pin 154 past the axial stop 162 towards the head end of the pin 154. In this way, the axial stop 162 can prevent overtightening of the nut 158, which can lead to undesirable locking of the chain joint defined by the chain links 102, 152 and the pin 154 such as from the plate 168 being forced against the plate 108, thus preventing rotation of the chain link 102 about the pin 154. The axial stop 164 can be configured in a similar manner as the axial stop 162, and thus the axial stop 164 can also block further advancement of the nut 160 along the pin 156 when the axial stop 164 contacts the pin 156. The axial stops 162, 164 can be implemented in different ways to block further advancement of the respective nuts 158, 160. In the illustrate case in FIG. 2, for example, the axial stop 162 can be implemented as a washer 190, while the axial stop 164 can be implemented as a washer 192.

Figure 3:
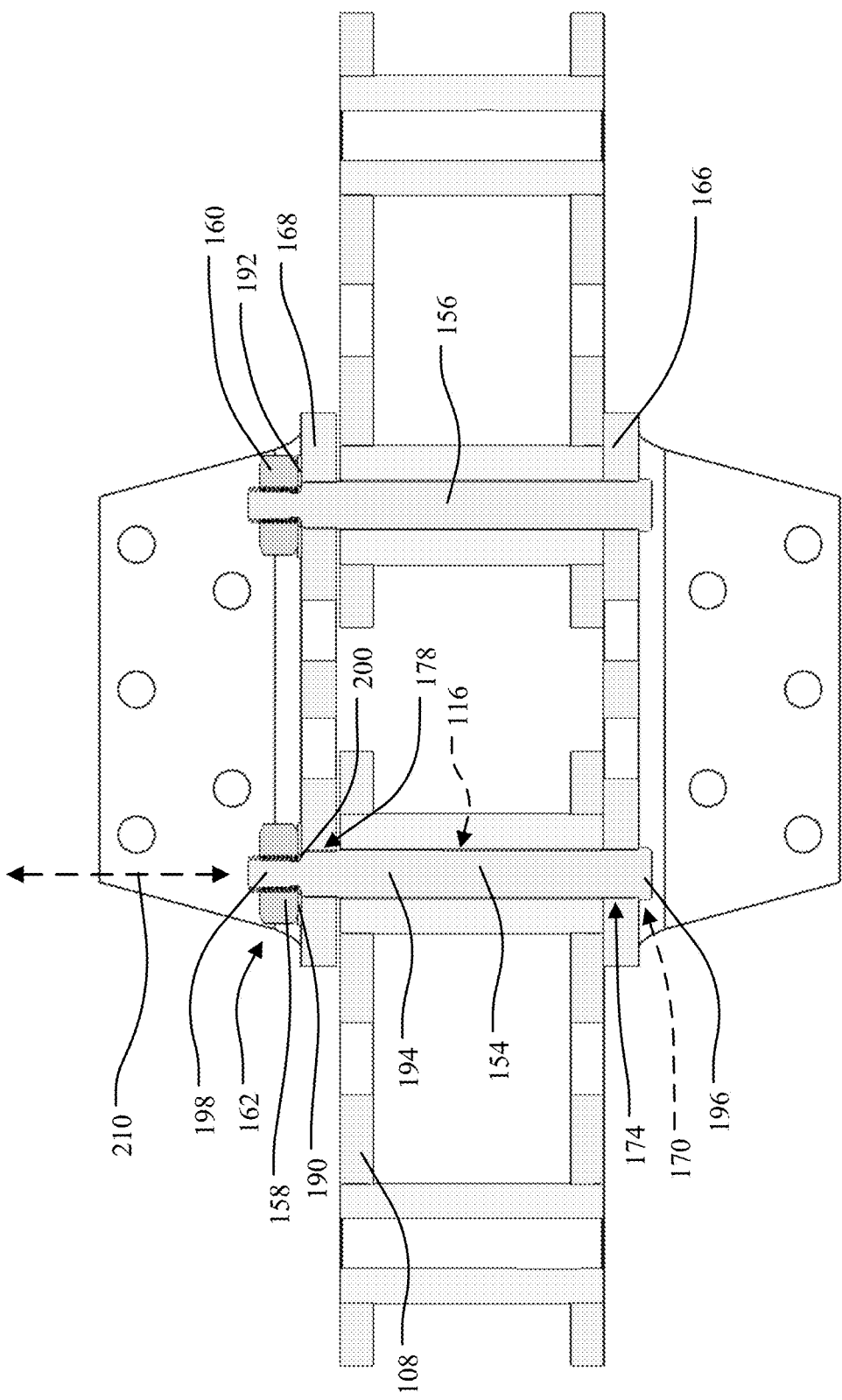
FIG. 3 shows a cross-sectional view of the chain assembly system of FIG. 2 taken along line 3-3 of FIG. 2.

FIG. 3 shows a cross-sectional view of the chain assembly system 150 taken along line 3-3 of FIG. 2, after the interference fits between the pins 154, 156 and the plate 166 have been created, and with the axial stops 162, 164 blocking further advancement of the respective nuts 158, 160. Each pin 154, 156 can be structured in a similar manner, and thus the following description of the pin 154 also pertains to the pin 156 in a corresponding fashion. The pin 154 can include a body 194, a head end 196 at one end of the body 194, and a thread end 198 at the other end of the body 194. As shown in FIG. 3, the head end 196 can have a larger cross-section than the body 194, the thread end 198, the bores 116, 170, and the holes 174, 178. In this way, the head end 196 is blocked from advancing past the plate 166, such as, for example, when the nut 158 is being tightened to create the interference fit. Correspondingly, the cross-section of the body 194 can be less than the cross-section of the bore 116 and the hole 174, while the cross-section of the thread end 198 can be smaller than the bores 116, 170, and the holes 174, 178. In some cases, the hole 174 can be substantially larger than the hole 178, which can have a cross-section that is substantially the same as the cross-section of the body 194 of the pin 154. In this way, the body 194 of the pin 154 can be more easily inserted through the hole 174, while still allowing for an interference fit to be created at the hole 178. As shown in FIG. 3, the pin 154 can include a shoulder 200, which can be defined at the interface or transition between the body 194 and the thread end 198. In some cases, the shoulder 200 can extend circumferentially around the entire pin 154 and can define a radial step for the pin 154; however, other shoulder geometries could also be employed.

Figure 4:
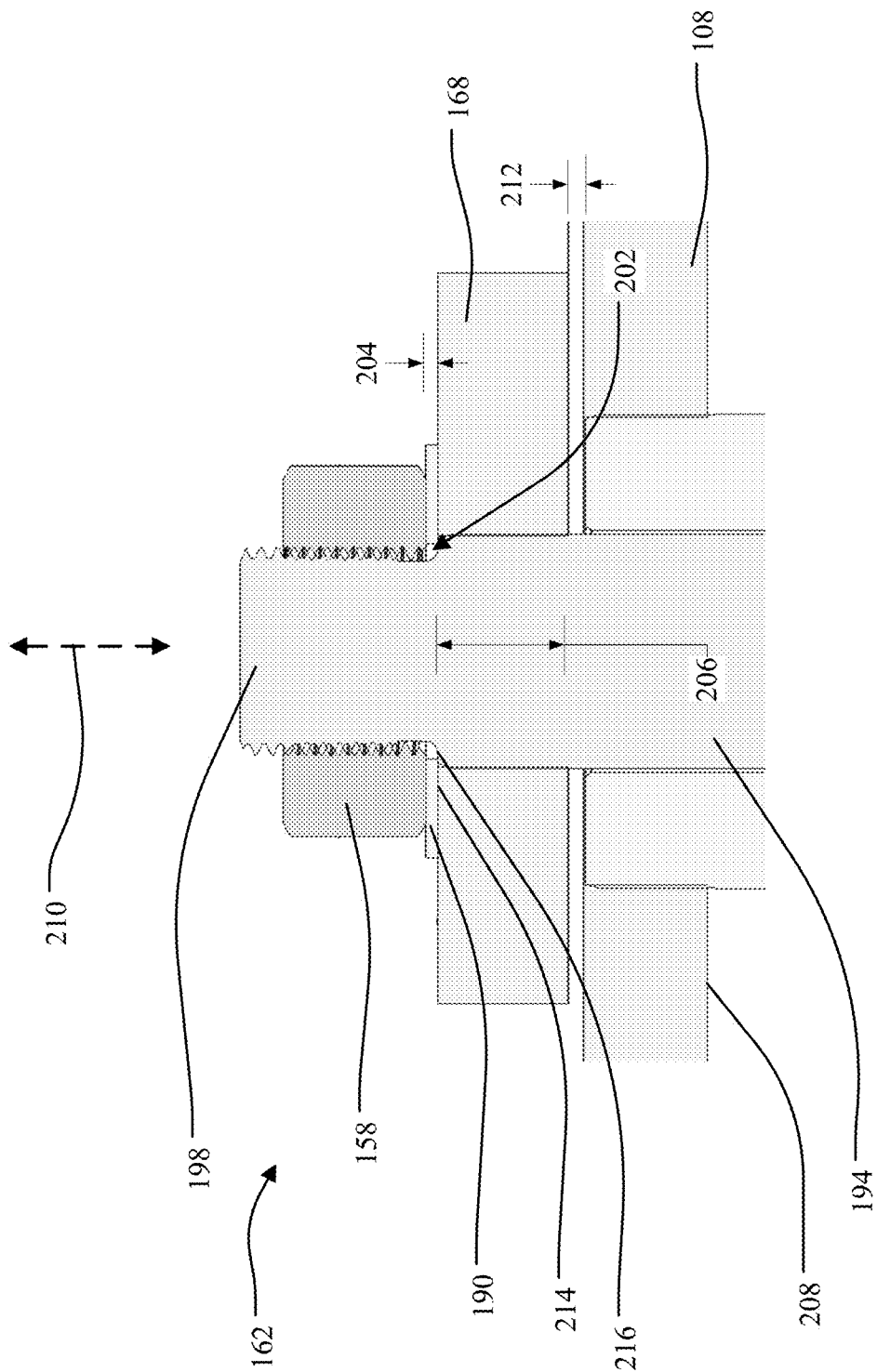
FIG. 4 shows an enlarged view of the cross-sectional view of FIG. 3.

In some embodiments, including the configuration shown in FIG. 4, the washer 190 can include a hole 202 that can have a cross-section that is larger than the thread end 198 of the pin 154 (for example, so that the thread end 198 can be inserted through the hole 202 of the washer 190), but which is smaller than the body 194 of the pin 154 (for example, at the shoulder 200). In some cases, the washer 190 can have a thickness 204, which along with the length of the body 194 and the thickness of the plate 168 can define a predetermined distance 206 that defines the location of the plate 168 on the body 194 of the pin 154. For example, the predetermined distance 206 can be defined from an end of the body 194 (such as at the shoulder 200) to a location on the body 194 of the pin 154 in which an inner surface 208 of the plate 168 is positioned. In addition, the predetermined distance 206 can be the maximum allowable distance the plate 168 can travel along the body 194 of the pin 154 (for example, in a direction towards the head end 196 of the pin 154). For example, due to the axial stop 162 that is a washer 190, the plate 168 is blocked from moving along an axial axis 210 (for example, that extends along a length of the pin 154) in a direction towards the head end 196 of the pin 154 past the predetermined distance 206. In this way, a gap 212 can be maintained between the plates 108, 168 even when the body 194 of the pin 154 contacts the axial stop 162 (in this example, the washer 190), which can prevent undesirable locking of the chain links together.

In some embodiments, the bores 116, 170 can be aligned and the thread end 198 of the pin 154 can be inserted through the bores 116, 170. For example, the thread end 198 of the pin 154 can be inserted through the hole 174, through the bore 116, and through the hole 178 until a portion of the thread end 198 is positioned outside of the hole 178 and external to the plate 168. In some cases, when the portion of the thread end 198 is positioned outside of the hole 178, the head end 196 of the pin 154 can contact the plate 166 to block further advancement of the pin 154 in a direction towards the plate 168. Then, the thread end 198 of the pin 154 can be inserted through the hole 202 of the washer 190, and the washer 190 can contact the plate 168. After this, the nut 158 can threadingly engage the thread end 198 of the pin 154 (by the engagement between threads of the nut 158 with corresponding threads of the thread end 198 of the pin 154) to position the washer 190 between the nut 158 and the plate 168. In some cases, the nut 158 can be loosely tightened using the operator's fingers (that is, "finger-tight") until the nut 158 contacts the washer 190. Then, a power tool (not shown) such as an impact driver can engage the exterior surface of the nut 158 (such as by engaging a tool adapter with the nut 158), and the power tool can rotate the nut 158 to advance the nut 158 along the thread end 198 of the pin 154 towards the head end 196 of the pin 154. As the nut 158 is tightened, the nut 158 forces the body 194 of the pin 154 through the hole 178 of the plate 168 thereby creating an interference fit between the body 194 of the pin 154 and the plate 168 at the hole 178. In other words, as the nut 158 is tightened, the nut 158 pushes an interior surface of the plate 168 that defines the hole 178 onto the exterior surface of the body 194 of the pin 154, thereby pulling the body 194 of the pin 154 through the hole 178 to create the interference fit.

In some embodiments, as the nut 158 is advanced (and after the interference fit has been created), the nut 158 is further tightened (for example, by the power tool) until the washer 190 contacts the body 194 of the pin 154, for example, at the shoulder 200. At this point, even if the nut 158 is attempted to be tightened even further, the washer 190 contacting the body 194 of the pin 154 blocks or stops relative movement between the nut 158 and the pin 154 and further advancement of the nut 158. Thus, the nut 158 is blocked from further advancement along the body 194 of the pin 154 towards the head end 196, which then blocks further advancement of the plate 168 in the same direction. In some embodiments, when the nut 158 is blocked from translating in a first direction, rotational movement that would otherwise result in translation of the nut 158 in the first direction is heavily resisted. This resistance can be felt by the operator of the power tool, which can provide a tactile response for the operator indicating to the operator that the nut 158 has been tightened enough to provide an interference fit, and that the body 194 of the pin 154 has contacted the axial stop 162 (for example and in this case, the washer 190). Thus, when the resistance is felt, the operator can (and should) stop further tightening the nut 158 to prevent damage to the power tool, such as, the motor of the power tool.

FIG. 4 shows an enlarged view of the cross-sectional view of FIG. 3, illustrating the nut 158 engaged with the thread end 198 of the pin 154, and with the axial stop 162 that is a washer 190 contacting the body 194 of the pin 154. As shown in FIG. 4, a surface 214 of the washer 190 (for example, the surface that is opposite the surface of the washer in contact with the nut 158) is in contact with an exterior surface 216 of the body 194 of the pin 154 (here, at the shoulder 200) to block translation of the pin 154 along the axial axis 210 in a direction towards the nut 158. In this way, blocking of translation of the pin 154 also blocks translation of the nut 158 along the axial axis 210 towards the head end 196 of the pin 154. Thus, the plate 168 is blocked from translating along the body 194 of the pin 154 beyond the predetermined distance 206, thereby maintaining the gap 212 of a sufficient size that avoids locking of the chain links 102, 152.

In some embodiments, the pin 156 can be installed in a similar manner as the pin 154 to create an interference fit between the pin 156 and the plate 168 at the hole 180. Thus, the previous description of the installation of the pin 154 also pertains to the installation of the pin 156. In addition, it should be understood that the pins 154, 156 can be installed simultaneously to prevent undesirable bending of the plate 168. For example, with the pins 154, 156 inserted appropriately, but before creating an interference fit between the pins 154, 156 and the plate 168, the nut 158 can be tightened a first amount, and subsequently, the nut 160 can be tightened a second amount substantially the same as the first amount. This iterative tightening process can be completed until an interference fit has been created between the pin 154 and the plate 168 at the hole 178, until an interference fit has been created between the pin 156 and the plate 168 at the hole 180, until the body 194 of the pin 154 contacts the axial stop 162 (for example, the washer 190 in this arrangement), and until the body of the pin 156 contacts the axial stop 164 (for example, the washer 192 in this arrangement).

While the washer 190 has been described as being a discrete component that is separate from the nut 158, in other configurations the washer 190 can be coupled to the nut 158. In some cases, the nut 158 can be integrally formed with the washer 190. For example, the nut 158 and the washer 190 can be a single monolithic component (that is, formed from a single piece of material).

In some embodiments, the nut 158 can include multiple bores that are coaxial. For example, a first bore can be directed into the nut 158 (at a first end of the nut 158), and a second bore can also be directed into the nut 158 (at the first end of the nut 158) that has a cross-section that is smaller than the first bore. In some cases, the second bore can have threads, and the first bore can include threads. The thread end 198 of the pin 154 can be inserted through the first bore, and can be threadingly engaged with the second bore. In some cases, a surface of the nut 158 (for example, at the second bore) can be the axial stop 162. In other words, the surface of the nut 158 can contact the body 194 of the pin 154 to block translation of the pin 154.

In some embodiments, the axial stop 162 can be implemented in still other different ways. For example, including when the nut 158 is increased in length, a protrusion can extend into the bore of the nut 158. In some cases, the protrusion can extend partially (or entirely) around the bore of the nut 158. For example, when the nut 158 extends partially around the bore of the nut 158, the protrusion can extend around at least 180 degrees around the bore of the nut 158 (for example, to support opposing ends of the pin 154). In this case, as the nut 158 is tightened, the end of the thread end 198 of the pin 154 contacts the protrusion to block further translation of the pin 154.

In some embodiments, the axial stop 162 can be implemented as a threaded insert, such as, for example, a threaded fastener. In this case, the threaded insert can be threadingly engaged at the bore of the nut 158 and can be advanced along the nut 158 until an end of the threaded fastener reaches a desired location. In this case, the position of an end of the threaded insert within the bore of the nut 158 can determine the axial stop, and the maximum allowable distance the pin 154 is allowed to travel within the bore until the end of the pin 154 contacts the end of the threaded insert. In some cases, this can be advantageous in scenarios in which the entire length of the bore of the nut 158 is not needed to create the interference fit.

In some embodiments, while the axial stop 162 has been described as directly blocking axial translation, in some embodiments, the axial stop 162 (or other axial stops described herein) can be implemented as a rotational stop. For example, in this case, the nut 158 can be rotated (and advanced along the pin 154) until the nut 158 contacts the rotational stop thereby blocking further rotation of the nut 158 in the same rotational direction. In this case, because the nut 158 is blocked from being rotated, the nut 158 is also blocked from further translating along the pin 158 towards the head end 196 of the pin 158.

Figure 5:
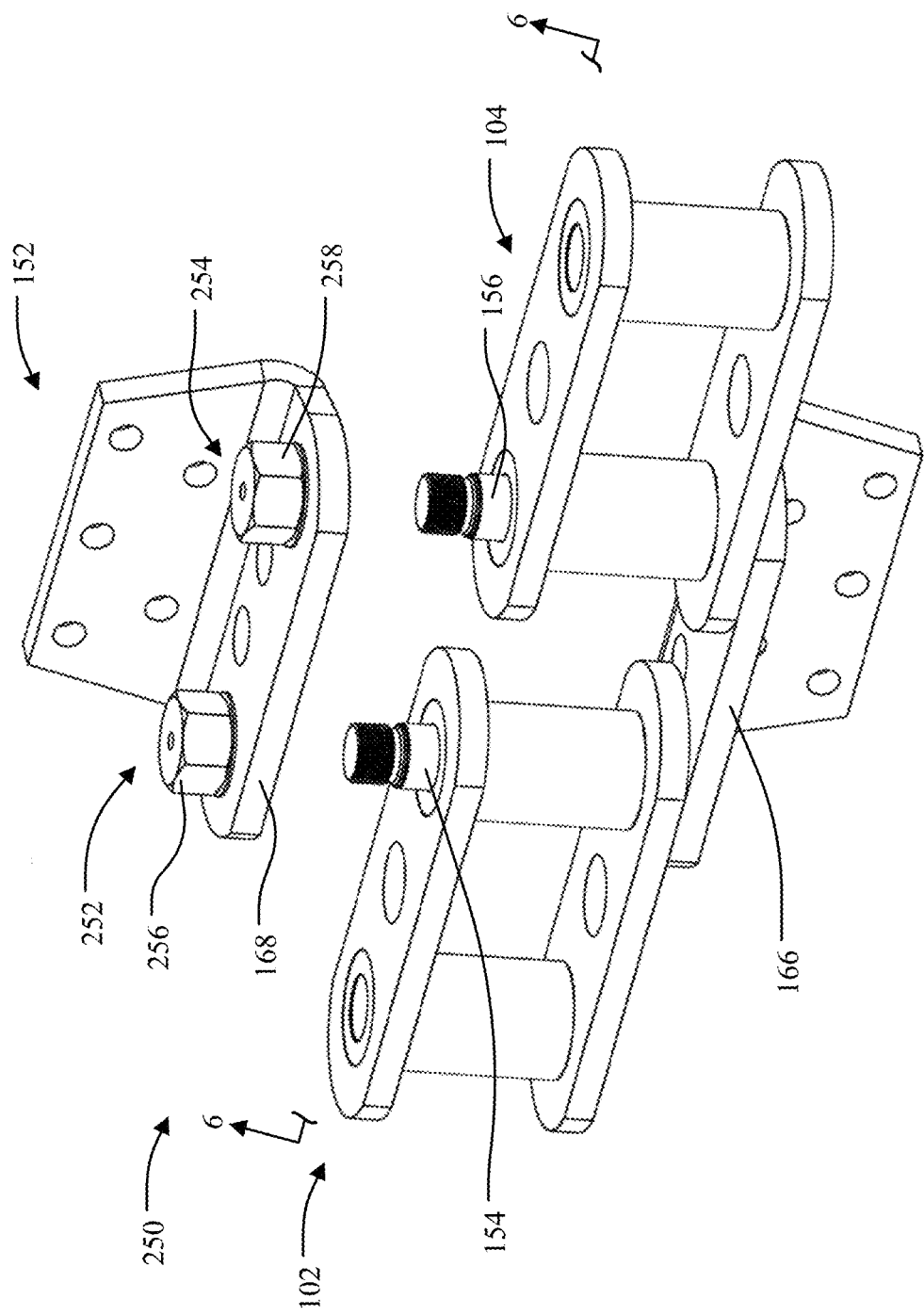
FIG. 5 shows a front perspective view of another chain assembly system.

FIG. 5 shows a front perspective view of a chain assembly system 250. The chain assembly system 250 is similar to the chain assembly system 150 and thus the description above with regard to the chain assembly system 150 also pertains to the chain assembly system 250. For example, the chain assembly system 250 can include the chain links 102, 104, 152, and the pins 154, 156. While the chain assembly system 250 can also have axial stops 252, 254, which can function in a similar manner as the axial stops 162, 164 described above, the axial stops 252, 254 can be implemented in a different way as the axial stops 162, 164. For example, the chain assembly system 250 can include nuts 256, 258, which can define the respective axial stop 252, 254.

Figure 6:
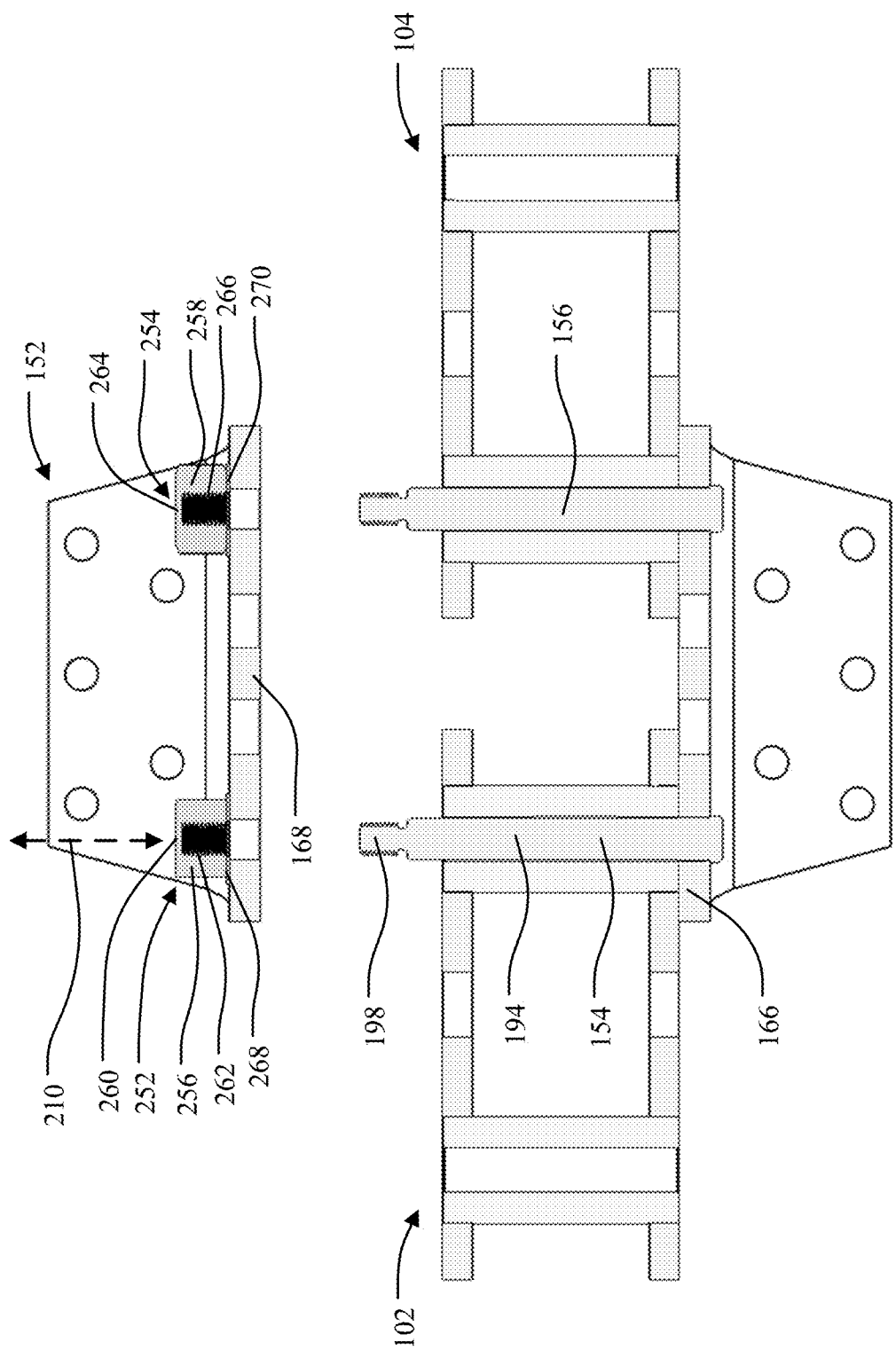
FIG. 6 shows a cross-sectional view of the chain assembly system of FIG. 5, taken along line 6-6 of FIG. 5.

FIG. 6 shows a cross-sectional view of the chain assembly system 250, taken along line 6-6 of FIG. 5. As shown in FIG. 6, the nut 256 can include a wall 260 that is positioned at an end of the nut 256, which can serve as the axial stop 252. In some configurations, the wall 260 can partially (or fully) enclose the bore 262 of the nut 256. For example, when the wall 260 partially encloses the bore 262, a portion of the bore 262 (for example, an end of the bore 262 farthest away from the plate 168) can be exposed to the ambient environment. In other words, a portion of the bore 262 can entirely extend through the nut 256. As another example, when the wall 260 fully encloses the bore 262, the portion of the bore 262 (for example, the end of the bore 262 farthest away from the plate 168) is not exposed to the ambient environment. In other words, the bore 262 extends partially through the nut 256 to create the wall 260. The wall 260 of the nut 256 can also block further translation of the pin 154. For example, as the nut 256 is tightened (and after an interference fit has been created between the body 194 of the pin 154 and the plate 168), the thread end 198 of the pin 154 can contact the wall 260 of the nut 256 to block further translation of the pin 154 along the axial axis 210 in a direction away from the head end 196 of the pin 154. In this way, the wall 260 can block further translation of the nut 256 along the axial axis 210 in a direction towards the head end 196 of the pin 154. In some embodiments, the nut 258 can be implemented in a similar manner as the nut 256. For example, the nut 258 can also include a wall 264 that can be the axial stop 254, and a bore 266. Thus, the previous description of the nut 256 also pertains to the description of the nut 258.

In some embodiments, the chain assembly system 250 can include washers 268, 270 that can be positioned between a respective nut 256, 258, and the plate 168. In this way, the washers 268, 270 can better distribute pressure provided by the nuts 256, 258, while preventing undesirable abrasive forces between the nuts 256, 258 and the plate 168.

Figure 7:
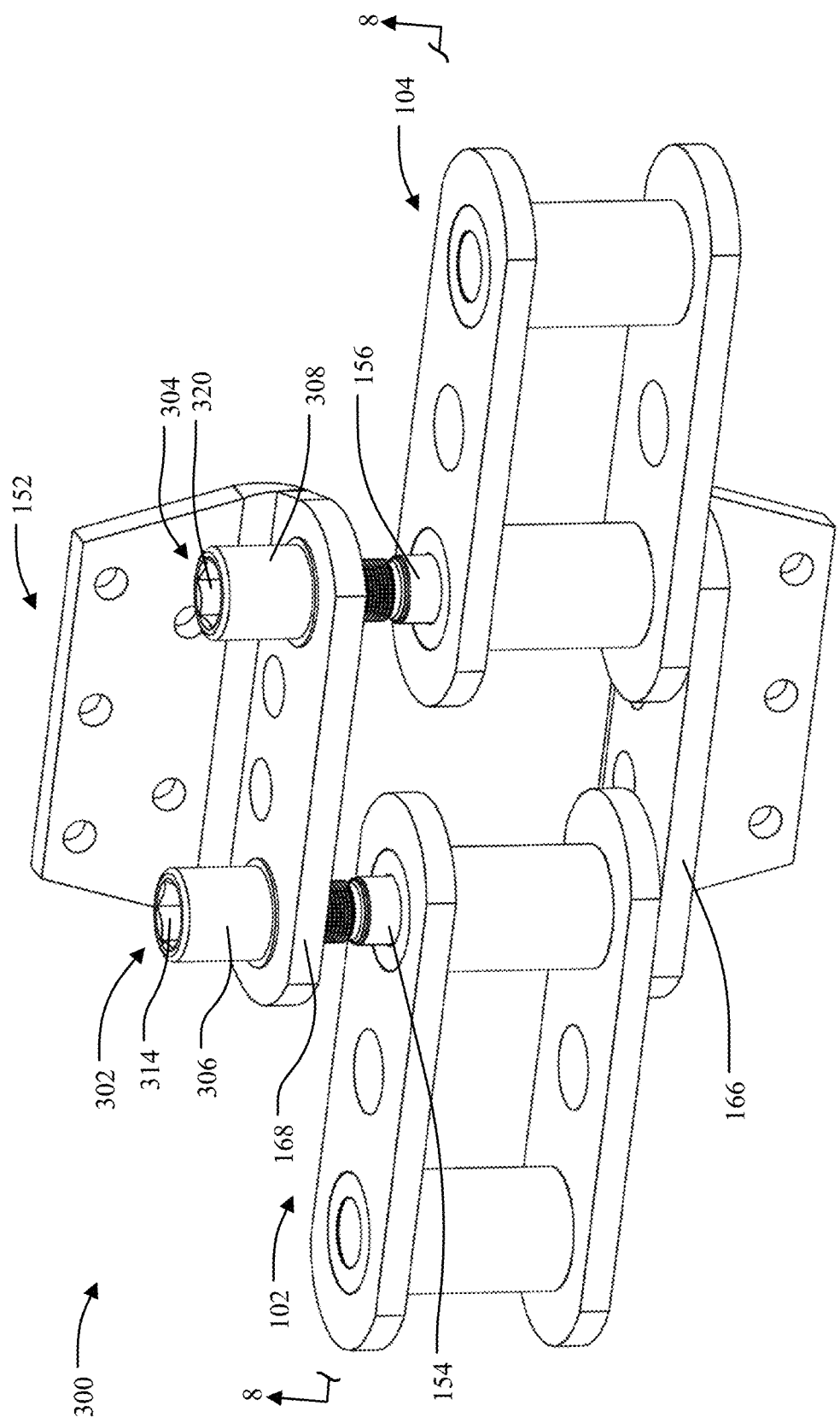
FIG. 7 shows a front perspective view of another chain assembly system.

FIG. 7 shows a front perspective view of a chain assembly system 300. The chain assembly system 150 is similar to the chain assembly system 300 and thus the description above with regard to the chain assembly system 150 also pertains to the chain assembly system 300. For example, the chain assembly system 300 can include the chain links 102, 104, 152, and the pins 154, 156. While the chain assembly system 300 can also have axial stops 302, 304 (see FIG. 8) which can function in a similar manner as the axial stops 162, 164 described above, the axial stops 302, 304 can be implemented in a different way as the axial stops 162, 164. For example, the chain assembly system 300 can include nuts 306, 308, which can define the respective axial stop 302, 304.

Figure 8:
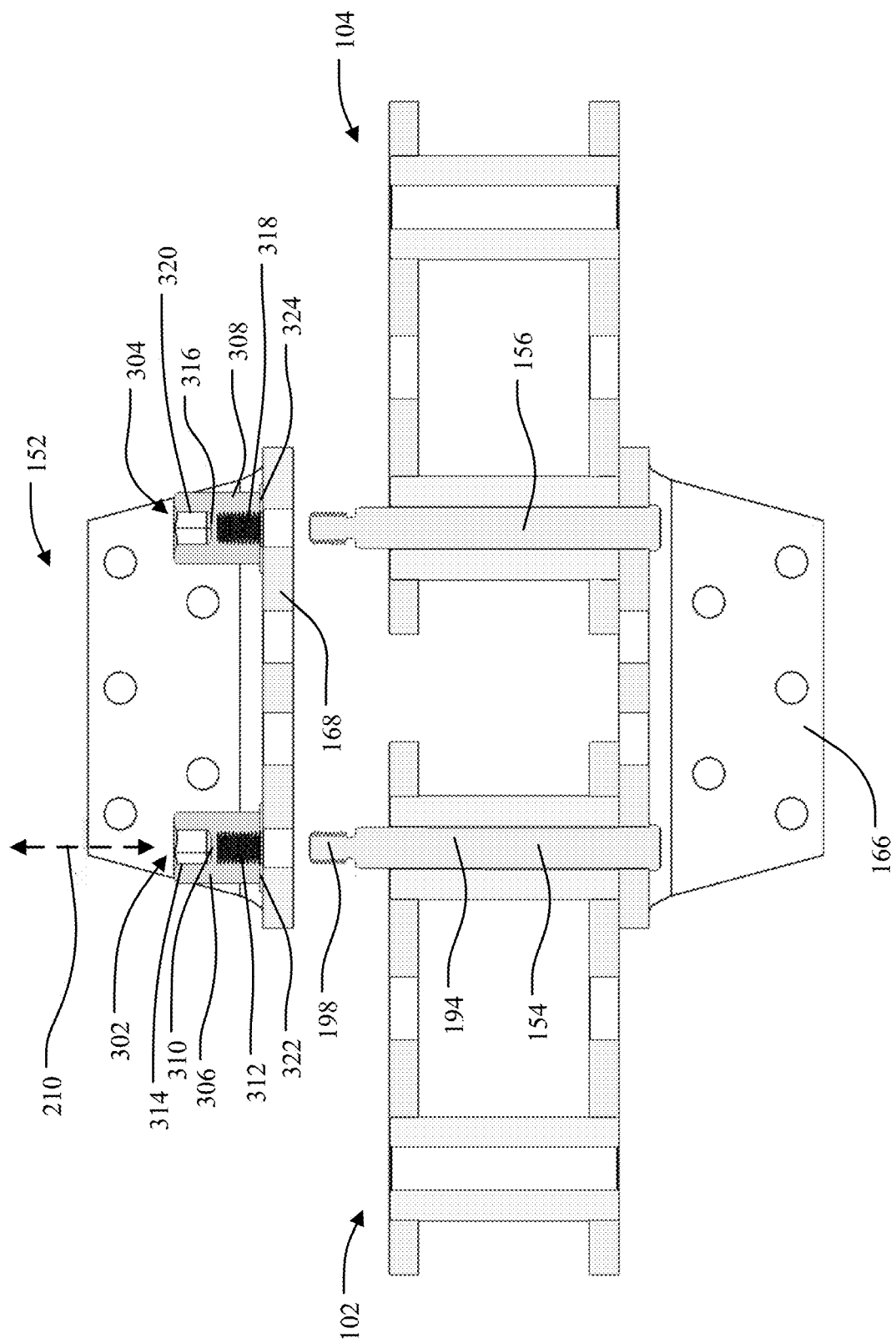
FIG. 8 shows a cross-sectional view of the chain assembly system of FIG. 7, taken along line 8-8 of FIG. 7.

FIG. 8 shows a cross-sectional view of the chain assembly system 300, taken along line 8-8 of FIG. 7. As shown in FIG. 8, the nut 306 can include a wall 310 that is positioned at a central region of the nut 306, which can be the axial stop 302. In some configurations, the wall 310 can partially (or fully) enclose the bore 312 of the nut 306. For example, when the wall 310 partially encloses the bore 312, a portion of the bore 312 (for example, an end of the bore 312 farthest away from the plate 168) can be exposed to the ambient environment. In other words, a portion of the bore 312 can be in fluid communication with a recess 314 of the nut 306 (e.g., that is in fluid communication with the ambient environment), which is directed into one side of the nut 306, while the bore 312 is directed into an opposing side of the nut 306. As another example, when the wall 310 fully encloses the bore 312, the portion of the bore 312 (for example, the end of the bore 312 farthest away from the plate 168) is not in fluid communication with the recess 314. In other words, the bore 312 extends partially through the nut 306 to create the wall 310, and in some cases, the recess 314 can also extend partially through the nut 306 to create the wall 310. In this way, the wall 310 can be positioned between the bore 312 and the recess 314. The wall 310 of the nut 306 can also block further translation of the pin 154. For example, as the nut 306 is tightened (and after an interference fit has been created between the body 194 of the pin 154 and the plate 168), the thread end 198 of the pin 154 can contact the wall 310 of the nut 306 to block further translation of the pin 154 along the axial axis 210 in a direction away from the head end 196 of the pin 154. In this way, the wall 310 can block further translation of the nut 306 along the axial axis 210 in a direction towards the head end 196 of the pin 154. In some embodiments, the wall 310 can also provide a stop for a tool adapter (not shown) that is inserted into the recess 314 and engages with an inner surface of the nut 306 at the recess 314 to drive rotation of the nut 306. For example, when the tool adapter contacts the wall 310, the tool adapter is blocked from advancing into the bore 312. Although the inner surface of the recess 314 is illustrated as having a hexagonal shape, in other configurations, the recess 314 can have other shapes, including those that can provide higher amounts of torque to the nut 306. In some cases, the inclusion of the recess 314 can transmit a higher amount of torque to the nut 306 as compared to, for example, a nut without a recess.

In some embodiments, the nut 308 can be implemented in a similar manner as the nut 306. For example, the nut 308 can also include a wall 316 that can be the axial stop 304, a bore 318, and a recess 320. Thus, the previous description of the nut 306 also pertains to the description of the nut 308. In some embodiments, the chain assembly system 300 can include washers 322, 324 that can be positioned between a respective nut 306, 308, and the plate 168. In this way, the washers 322, 324 can better distribute pressure provided by the nuts 306, 308, while preventing undesirable abrasive forces between the nuts 306, 308 and the plate 168.

Figure 9:
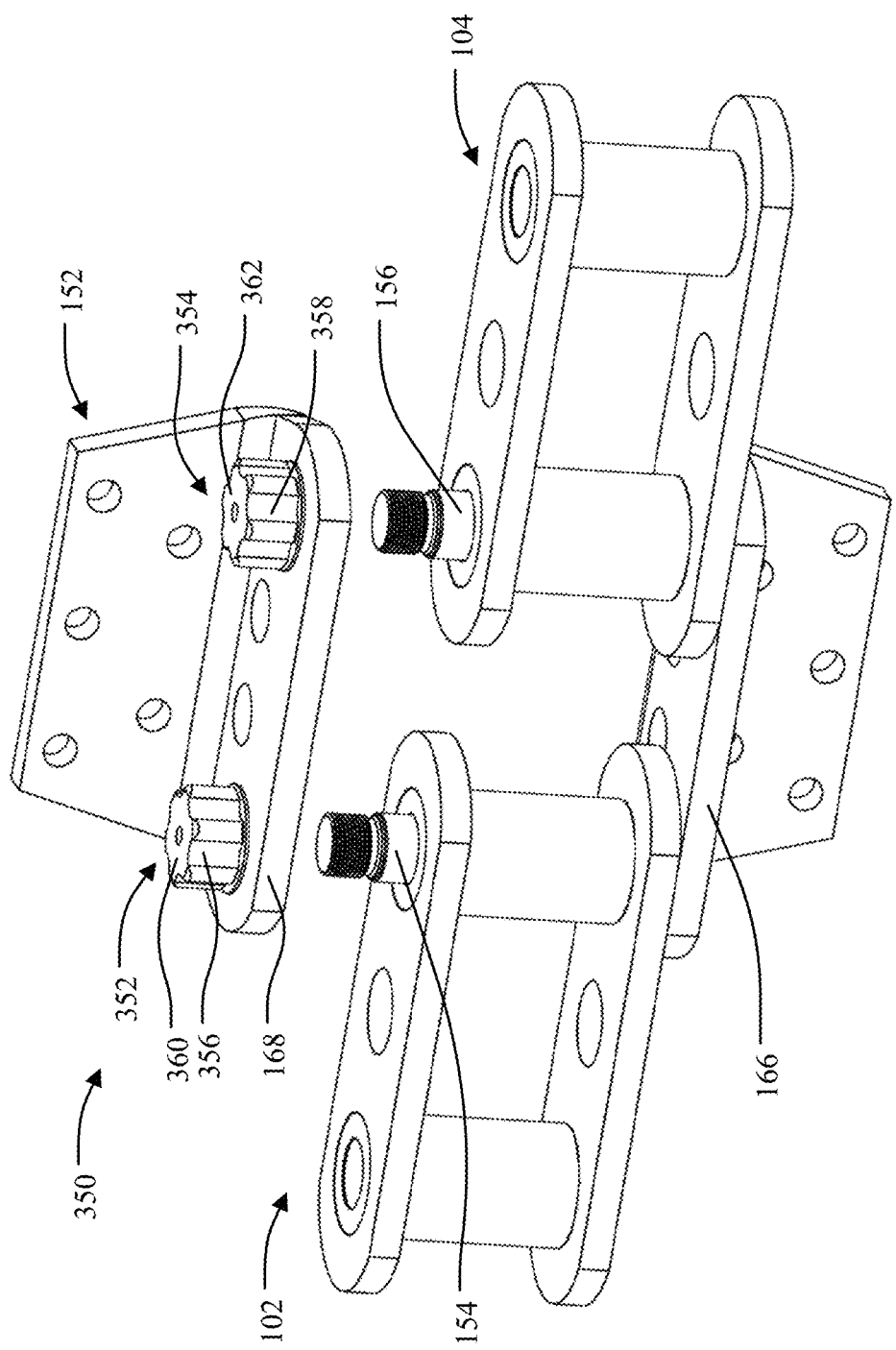
FIG. 9 shows a front perspective view of a chain assembly system.

FIG. 9 shows a front perspective view of a chain assembly system 350. The chain assembly system 150 is similar to the chain assembly system 350 and thus the description above with regard to the chain assembly system 150 also pertains to the chain assembly system 350. For example, the chain assembly system 350 can include the chain links 102, 104, 152, and the pins 154, 156. While the chain assembly system 350 can also have axial stops 352, 354, which can function in a similar manner as the axial stops 162, 164 described above, the axial stops 352, 354 can be implemented in a different way as the axial stops 162, 164. For example, the chain assembly system 300 can include nuts 356, 358, which can define the respective axial stop 352, 354. In particular, the nuts 356, 358 can include a respective wall 360, 362, each of which can be the respective axial stop 352, 354. In some cases, each wall 360, 362 can be positioned on an end of the respective nut 356, 358 opposite the bore of the respective nut 356, 358.

As shown in FIG. 9, the exterior surface of each nut 356, 358 can have a star shape when viewed from a top view of the nut. In particular, the star shape of each nut 356, 358 can be defined by multiple recesses directed into the exterior surface, and multiple protrusions extending out from the exterior surface, with each recess being positioned between a pair of adjacent protrusions (and vice versa). In some cases, this configuration of the exterior surface of the nut 356, 358 can allow for higher amounts of torque to be transmitted to the nut 356, 358.

The present disclosure has described one or more preferred embodiments, and it should be appreciated that many equivalents, alternatives, variations, and modifications, aside from those expressly stated, are possible and within the scope of the invention.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

What is claimed is:

1. A chain assembly system comprising:
   an inner chain link;
   an outer chain link, the inner chain link and the outer chain link defining a pair of bores;
   a pin comprising a head end that defines a head, and a thread end opposite the head end having threads;
   a nut configured to threadingly engage the threads of the thread end of the pin; and
   an axial stop that is configured to block further advancement of the nut along the thread end of the pin towards the head end of the pin when the pin contacts the axial stop;
   wherein the thread end of the pin is configured to be inserted through the pair of bores that are aligned, and threadingly engaged with the nut that is configured to be externally positioned relative to the outer chain link; and
   wherein when the thread end of the pin is inserted and the nut is threadingly engaged with the thread end of the pin, the nut is configured to be tightened to create an interference fit between the pin and the outer chain link at the bore of the outer chain link, and further tightened until the pin contacts the axial stop to block translation of the pin thereby blocking translation of the nut.

2. The chain assembly system of claim 1, wherein the pin comprises a body that is coupled to the head end and the thread end, and
   wherein a first cross-section of the thread end is smaller than a second cross-section of the body to define a shoulder that is a radial step.

3. The chain assembly system of claim 2, further comprising a washer that defines the axial stop, the washer having a hole that is larger than the thread end of the pin on which the washer is receivable and small enough that the washer does not extend beyond the shoulder on the pin,
   such that, as the nut is advanced along the thread end and towards the head end to push the washer into the outer link and toward the shoulder of the pin, the washer contacts the shoulder of the pin to block further axial advancement of the nut thereby serving as the axial stop.

4. The chain assembly system of claim 1, wherein the nut comprises a bore defining an open end and an enclosed end,
   wherein the enclosed end includes a wall that is the axial stop, and
   wherein the pin contacts the wall to block further advancement of the nut along the pin.

5. The chain assembly system of claim 4, wherein the bore partially extends through the nut so that the wall fully encloses the nut.

6. The chain assembly system of claim 5, wherein the nut comprises a recess,
   wherein the bore is directed into one side of the nut,
   wherein the recess is directed into an opposing side of the nut, and wherein the recess is configured to receive a tool adapter to drive rotation of the nut.

7. The chain assembly system of claim 1, wherein the nut comprises:
   a first bore having a first cross-section; and
   a second bore coaxial to the first bore and adjacent thereto, the second bore having a second cross-section smaller than the first cross-section of the first bore, the second bore having threads,
   wherein an end surface of the nut proximal to the bore is the axial stop,
   wherein the thread end of the pin is configured to be inserted through the first bore, into the second bore, and threadingly engaged with the second bore, and
   wherein the surface of the nut at the second bore contacts the body of the pin to block further advancement of the pin, thereby blocking further advancement of the nut along the pin.

8. The chain assembly system of claim 1, wherein the nut is a single nut that is configured to be advanced along the thread end of the pin to create an interference fit between the pin and the outer chain link.

9. The chain assembly system of claim 1, wherein an exterior surface of the nut is configured to be engaged by a power tool to advance the nut to create the interference fit.

10. The chain assembly system of claim 1, wherein a portion of the pin is not configured to be broken off from the pin after the interference fit is created.

\* \* \* \* \*